US012491614B1

(12) United States Patent
Tsai et al.

(10) Patent No.: US 12,491,614 B1
(45) Date of Patent: Dec. 9, 2025

(54) STAPLER WITH IMPROVED DRIVING STRUCTURE

(71) Applicants: SAME YONG INDUSTRIAL CO., LTD., Taichung (TW); EVERPRO INTERNATIONAL CORP., Taichung (TW)

(72) Inventors: Fu-Cheng Tsai, Taichung (TW); Kun-Hon Chen, Taichung (TW)

(73) Assignees: SAME YONG INDUSTRIAL CO., LTD, Taichung (TW); EVERPRO INTERNATIONAL CORP, Taichung (TW)

( * ) Notice: Subject to any disclaimer, the term of this patent is extended or adjusted under 35 U.S.C. 154(b) by 0 days.

(21) Appl. No.: 19/008,893

(22) Filed: Jan. 3, 2025

(30) Foreign Application Priority Data

Jun. 11, 2024 (TW) ................................ 113121477

(51) Int. Cl.
*B25C 5/11* (2006.01)

(52) U.S. Cl.
CPC ..................................... *B25C 5/11* (2013.01)

(58) Field of Classification Search
None
See application file for complete search history.

(56) References Cited

U.S. PATENT DOCUMENTS

| | | | | |
|---|---|---|---|---|
| 9,643,308 | B2 * | 5/2017 | Ebbesson | B25C 5/0242 |
| 2021/0008702 | A1 * | 1/2021 | Wang | B25C 5/11 |
| 2021/0205971 | A1 * | 7/2021 | Wang | B25C 5/11 |
| 2023/0278180 | A1 * | 9/2023 | Huang | B25C 5/11 227/8 |
| 2024/0269814 | A1 * | 8/2024 | Yuan | B25C 5/1617 |

* cited by examiner

*Primary Examiner* — Tanzim Imam

(74) *Attorney, Agent, or Firm* — Birch, Stewart, Kolasch & Birch, LLP

(57) ABSTRACT

A stapler includes a body, first and second shafts connected to the body, a staple driver having a hooked hole, an elastic unit elastically driving the staple driver, an operation lever inserted by the first shaft, a third shaft making the operation lever pivotably connected with a pivotably connecting member, a hook member having a second hole wherein the second shaft is inserted, an elongated hole wherein the third shaft is inserted, and a hook portion releasably hooked at the hooked hole, and a fourth shaft making the pivotably connecting member pivotably connected with the hook member in a way that the fourth shaft is slidably abutted against a shaft displacement limiting portion when the hook member is swung. A first distance is defined between the first and third shafts, and a second distance smaller than the first distance is defined between the third and fourth shafts.

15 Claims, 13 Drawing Sheets

STAPLER WITH IMPROVED DRIVING STRUCTURE

BACKGROUND OF THE INVENTION

1. Field of the Invention

The present invention relates to the field of stapling technique and more particularly, to a stapler with improved driving structure.

2. Description of the Related Art

U.S. Pat. No. 9,643,308B1 disclosed a stapler which transmits the received force by a first coupling shaft, a second coupling shaft, a third coupling shaft and a fourth coupling shaft. The stapler is configured in a way that the distance between the first and third coupling shafts is larger than 1.2 to 1.6 times the distance between the third and fourth coupling shafts for providing the user a specific force applying mode. However, such mode has limited effort-saving effect, so the stapler still needs improvement.

Besides, for the conventional stapler, it has to strike a balance between the downward pressing force applied to the operation lever to trigger the stapler and the elastic force of the plate spring for providing a staple striking force. In the condition that the elastic force for providing the staple striking force is too large, although the firmness of the stricken staple can be ensured, the user has to apply a relatively larger downward pressing force to operate the operation lever. Such operation consumes relatively more effort, resulting in operational inconvenience. On the other hand, in the condition that the elastic force for providing the staple striking force is too small, although the user can operate the operation lever by applying a relatively smaller downward pressing force so that the operation is effort-saving, it is afraid that the too small elastic force for providing the staple striking force will cause poor staple striking effect. Therefore, providing a stapler which is easily adjustable during the manufacture thereof for the downward pressing force applied to the operation lever and the staple striking force, or has both advantages of effort-saving operation and high staple striking positivity, is a goal the industry strives toward.

In addition, for the conventional stapler, after the staple striking is finished and the operation lever is moved back to the to-be-trigger position for being pressed downwardly again, the user can immediately press the operation lever downward again for another time of stapling. In other words, the conventional stapler doesn't have any safety mechanism for avoiding false triggering, so it still needs improvement.

SUMMARY OF THE INVENTION

The present invention has been accomplished in view of the above-noted circumstances. It is a primary objective of the present invention to provide a stapler, which can provide the user a specific force applying mode relatively better in effort-saving effect.

It is another objective of the present invention to provide a stapler, which is provided with a relatively longer staple driving stroke, so that the plate spring having a relatively smaller elastic force for providing the staple striking force may be provided to enable that the staple driver can generate relatively larger potential energy to strike the staple, so the effects of effort-saving operation and positive staple striking can be attained.

To attain the above primary objective, the present invention provides a stapler, which includes a body, a first shaft, a second shaft, a staple driver, an elastic unit, an operation lever, a third shaft, a pivotably connecting member, a hook member, a fourth shaft, and a restoring member. The body has a first shaft connecting portion, a second shaft connecting portion, and a shaft displacement limiting portion. The first shaft is connected to the first shaft connecting portion of the body. The second shaft is connected to the second shaft connecting portion of the body. The staple driver is disposed in the body in a vertically displaceable manner. The staple driver has an installation hole and a hooked hole. The elastic unit is disposed in the body. An end of the elastic unit is inserted in the installation hole of the staple driver. The operation lever has a first hole and a first lower pivot hole. The first shaft is inserted through the first hole. The third shaft is connected to the first lower pivot hole of the operation lever. The pivotably connecting member has a second lower pivot hole and a first upper pivot hole. The third shaft is pivotally connected to the second lower pivot hole. The hook member has a second hole, an elongated hole, a second upper pivot hole and a hook portion. The second shaft is inserted through the second hole. The third shaft is inserted through the elongated hole. The hook portion is releasably hooked at the hooked hole of the staple driver. The fourth shaft is pivotally connected to the first upper pivot hole of the pivotably connecting member and the second upper pivot hole of the hook member. When the hook member is swung, the fourth shaft is slidably abutted against the shaft displacement limiting portion of the body. The restoring member has a first connecting end connected to the body, and a second connecting end connected to the hook member in a way that the elastic force of the restoring member makes the hook portion of the hook member displace downwardly. A first distance is provided from the axis of the first shaft to the axis of the third shaft. A second distance is provided from the axis of the third shaft to the axis of the fourth shaft. The first distance is smaller than or equal to the second distance.

Resulted from the above-described technical features, especially the unique design that the first distance is smaller than or equal to the second distance and the fourth shaft, when being displaced, is slidably abutted against the shaft displacement limiting portion, when the operation lever is pressed downward to drive the hook member to swing through the third shaft, an additional effort arm is provided by the partial hook member and/or the partial pivotably connecting member located in the scope of the second distance, which supplementarily drives the hook member to swing. Because the second distance is larger than the first distance and thereby the aforementioned effort arm is relatively longer, it is relatively easier to drive the hook member to swing, thereby easily driving the staple driver to move upward, such that relatively better effort-saving effect is attained.

Preferably, the first distance is smaller than the second distance, such that the effort-saving effect is even better. More preferably, the first distance is 0.8 to 0.9 times the second distance, such that the optimum effort-saving effect is attained.

Preferably, the shaft displacement limiting portion is located above the first shaft connecting portion and the second shaft connecting portion for better space utilization and abutment with the fourth shaft.

Preferably, the shaft displacement limiting portion has an arc section. When the hook member is swung, the fourth shaft is displaced and abutted against the arc section of the shaft displacement limiting portion. In this way, the fourth shaft can be smoothly abutted against the shaft displacement limiting portion.

Preferably, the shaft displacement limiting portion further has a straight section integrally connected with the arc section. When the hook member is swung, the contact extent of the fourth shaft being abutted against the shaft displacement limiting portion gradually increases from the arc section to the straight section, so as to provide gradually increasing pushing force to the hook member, thereby attaining relatively better effort-saving effect.

Preferably, an included angle is provided between an imaginary extending line passing the axis of the first shaft and the axis of the third shaft and another imaginary extending line passing the axis of the third shaft and the axis of the fourth shaft. The aforementioned included angle is ranged from 30 degrees to 57 degrees, which is helpful in attaining relatively better effort-saving effect.

Preferably, the restoring member is a torsion spring, and the torsion spring has a looped installation portion, and the first connecting end and the second connecting end, which extend from the looped installation portion. The looped installation portion is sleeved onto the second shaft connecting portion of the body. The first connecting end is connected to the first shaft connecting portion, and the second connecting end is connected to the hook portion. In this way, the space utilization is effective for the installation of the restoring member, and the hook member is applied with stable restoring elastic force.

To attain the aforementioned another objective, the body of the stapler provided by the present invention has a staple driver sliding portion and a staple outlet portion communicating with the staple driver sliding portion. The staple outlet portion is configured for accommodating a staple. The staple driver is slidably disposed in the staple driver sliding portion of the body, and configured for passing through the staple outlet portion of the body to strike the staple. The staple driver has a bottom end, and displaceable relative to the staple driver sliding portion between a protruding position and a retracted position. When the staple driver is located at the protruding position, the bottom end protrudes out of the staple outlet portion. When the staple driver is located at the retracted position, the bottom end is retracted into the staple outlet portion. The elastic unit has an elastically deformable plate spring, and an elastic abutting portion. The plate spring is fixed to the body, and has a free end. The free end is inserted in the installation hole of the staple driver for providing elastic force to make the staple driver slide toward the protruding position. The elastic abutting portion is configured for providing elastic force to make the staple driver stay at the protruding position. The operation lever is connected to the body in a way that the operation lever is pivotable between an extend-out position and a pressed-down position. The hook portion is directly or indirectly driven by the operation lever, and separatably hooked at the hooked hole of the staple driver. The restoring member is configured for providing elastic force to make the operation lever move back to the extend-out position from the pressed-down position. When the operation lever is driven to move from the extend-out position to the pressed-down position, the hook portion drives the staple driver to move away from the protruding position until the hook portion is separated from the hooked hole so that the elastic force of the plate spring drives the staple driver to move toward the protruding position so as to make the bottom end of the staple driver pass through the staple outlet portion to strike the staple, and the elastic abutting portion makes the bottom end of the staple driver stay at the protruding position.

Resulted from the above-described technical features, a relatively longer staple driving stroke of the staple driver is provided in the limited space in the body. The staple driving stroke refers to the distance from the position of the staple driver being driven by the hook portion and separated therefrom to the protruding position, such that a greater potential energy can be converted into kinetic energy for the staple driver to impact the staple. As such, a sufficient staple striking force can be provided by using the plate spring relatively fewer in amount or smaller in elasticity. Because the bottom end of the staple driver protrudes out of the staple outlet portion when striking the staple, the staple is driven relatively deeper, such that the effects of effort-saving operation and positive staple striking are attained.

Preferably, the elastic abutting portion is provided on another plate spring abutted on the formerly mentioned plate spring. The aforementioned another plate spring has a body portion abutted on the formerly mentioned plate spring, and the elastic abutting portion inclinedly extending from the body portion. The elastic abutting portion is abutted against a bottom edge of the installation hole. When the staple driver is located at the protruding position, the free end of the plate spring is abutted against a top edge of the installation hole. When the staple driver is located at the retracted position, the free end of the plate spring is separated from the top edge of the installation hole. In this way, using another plate spring to provide the elastic abutting portion makes the elastic abutting portion and the plate spring cooperate to provide the elastic force for making the staple driver slide toward the protruding position, i.e. the staple striking force or the force the downward pressing force for operating the operation lever has to overcome. That can attain the effect of conveniently setting or adjusting the staple striking force (or the downward pressing force for the operation lever) during the manufacture of the stapler.

Preferably, the elastic abutting portion is provided on an elastic sheet or an elastic wire inclinedly fixed to the plate spring. The elastic abutting portion is abutted against a bottom edge of the installation hole. When the staple driver is located at the protruding position, the free end of the plate spring is abutted against a top edge of the installation hole. When the staple driver is located at the retracted position, the free end of the plate spring is separated from the top edge of the installation hole. In this way, using the elastic sheet or elastic wire to provide the elastic abutting portion makes the elastic abutting portion and the plate spring cooperate to provide the elastic force for making the staple driver slide toward the protruding position, i.e. the staple striking force or the force the downward pressing force for operating the operation lever has to overcome. That can attain the effect of conveniently setting or adjusting the staple striking force (or the downward pressing force for the operation lever) during the manufacture of the stapler, and can use only one plate spring to serve as the primary member for providing the staple striking force such that the effort-saving effect can be further attained.

Preferably, the plate spring is directly provided at the free end thereof with the elastic abutting portion. In this way, it is workable to use only one plate spring to provide the staple striking force and the maintaining force making the staple driver stay at the protruding position, not only facilitating the manufacture and the assembly, but also attaining the effects of effort-saving operation and positive staple striking.

It is still another objective of the present invention to provide a stapler, which has a safety mechanism for avoiding false triggering after the stapler is triggered.

To attain the aforementioned still another objective, for the stapler provided by the present invention, when the bottom end of the staple driver stays at the protruding position and the operation lever is moved back to the extend-out position from the pressed-down position, the hook portion is abutted on a surface of the staple driver in a stuck manner and located adjacent to the hooked hole. Because the hook portion is abutted on the surface of the staple driver in a stuck manner, the staple driver is tightly abutted against the staple driver sliding portion of the body. In such status, when the user presses the operation lever, the hook portion cannot drive the staple driver to displace away from the protruding position again. In other words, the above-described mechanism provides a safety insurance switch to disable the stapler from re-triggering, thereby attaining the aforementioned objective.

Preferably, when the bottom end of the staple driver is located at the protruding position and applied with a force which displaces the staple driver from the protruding position to the retracted position, the staple driver is displaced relative to the hook portion to make the hook portion hooked at the hooked hole, so as to ensure that the hook portion can drive the staple driver to displace away from the protruding position for striking the staple again. In other words, the user can take an action of holding the stapler to press the bottom end of the staple driver on any object to retract the bottom end of the staple driver to the retracted position, which can be regarded as a safety-off action.

Preferably, the hooked hole of the staple driver is located above the installation hole, and the staple driver is provided at a top end thereof with an inclined guiding surface for slidably abutted against the hook portion. In this way, when the operation lever is restored, the hook portion can be guided by the guiding surface to be easily abutted against the surface of the staple driver in a stuck manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The stapler provided by the present invention will be further described in the embodiments given herein below and the accompanying drawings, and wherein.

DETAILED DESCRIPTION OF THE INVENTION

Figure 1:
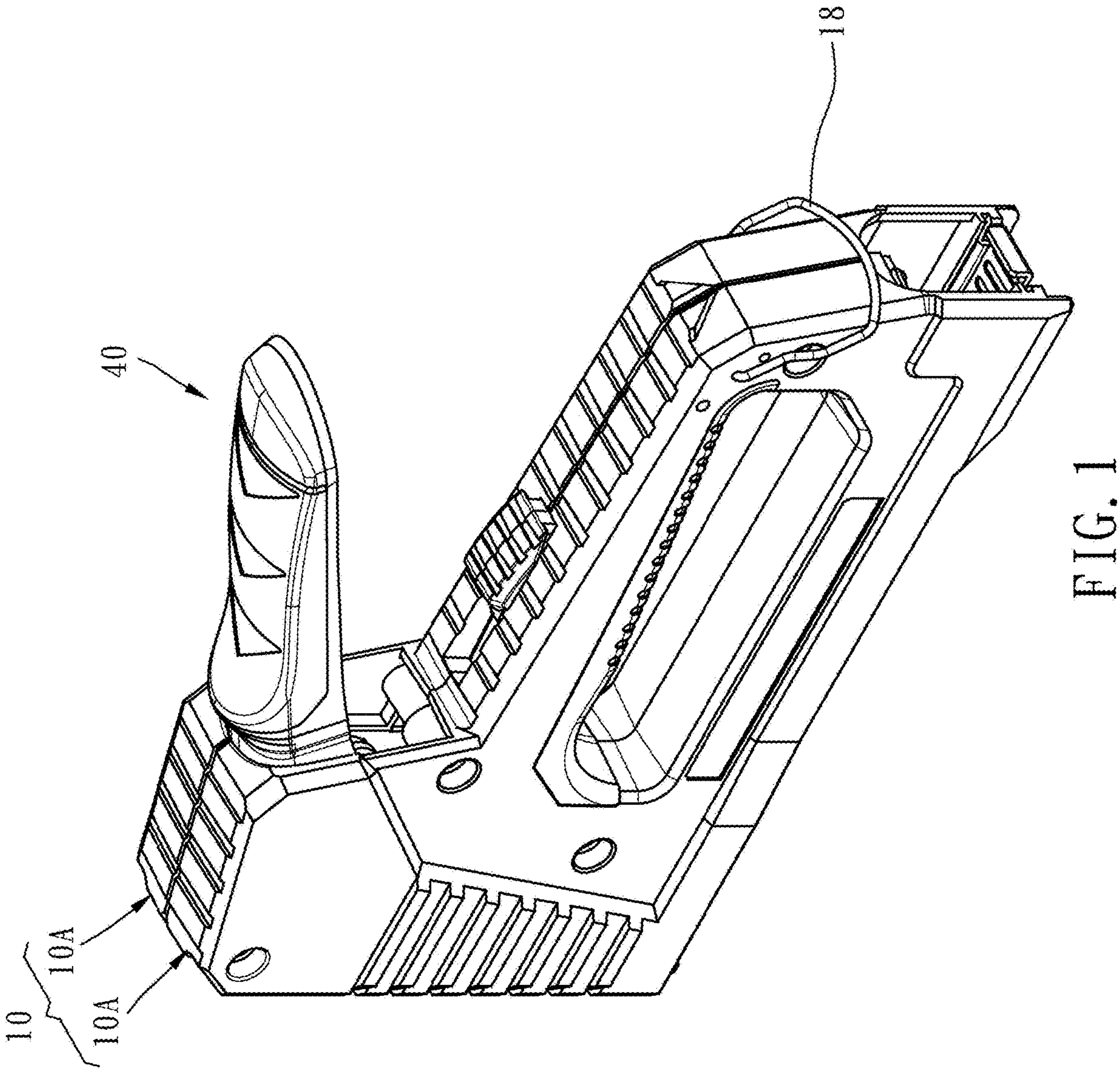
FIG. 1 is an assembled perspective view of a stapler according to a first preferred embodiment of the present invention.
Figure 2:
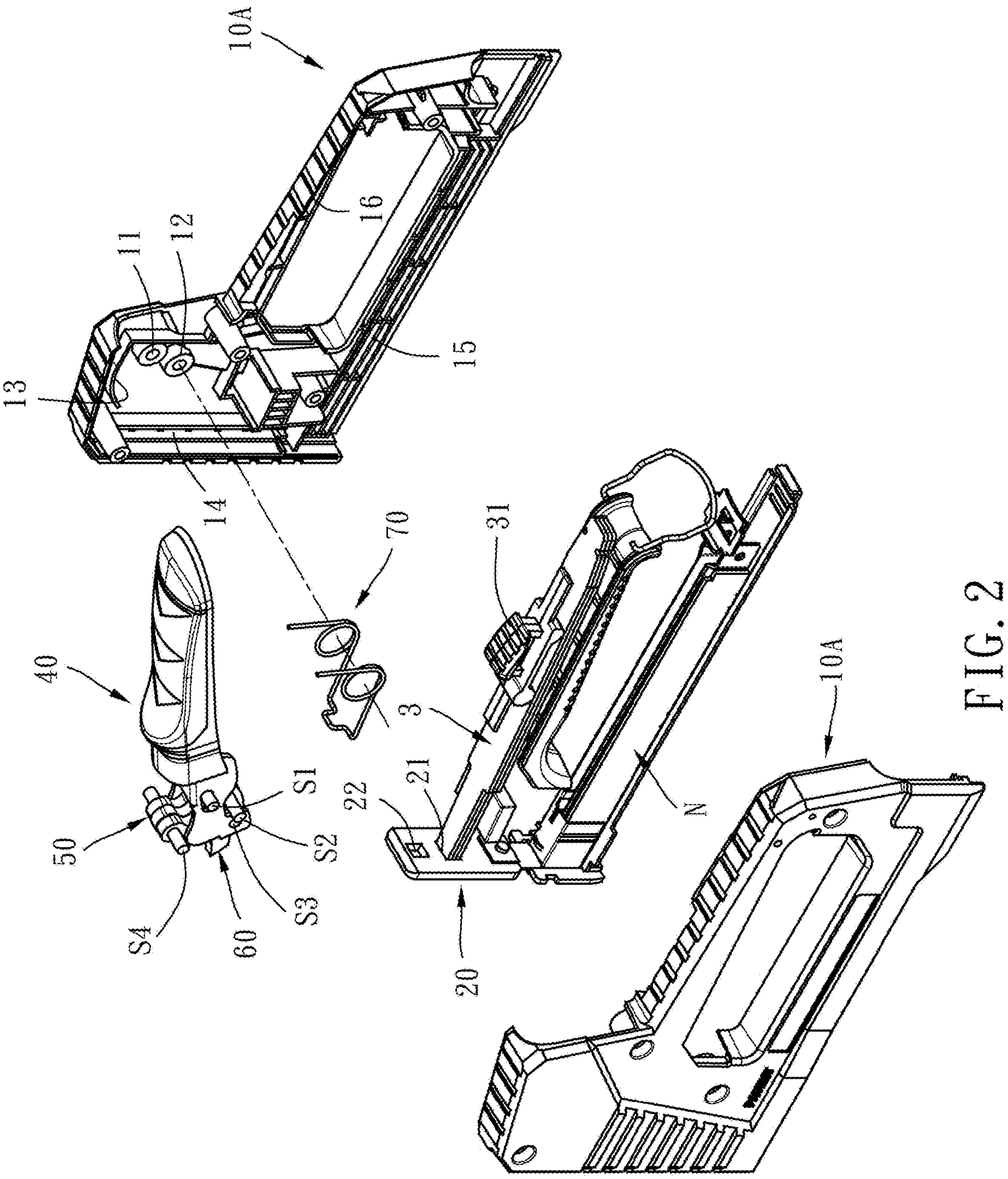
FIG. 2 is an exploded perspective view of the stapler according to the first preferred embodiment of the present invention.
Figure 3:
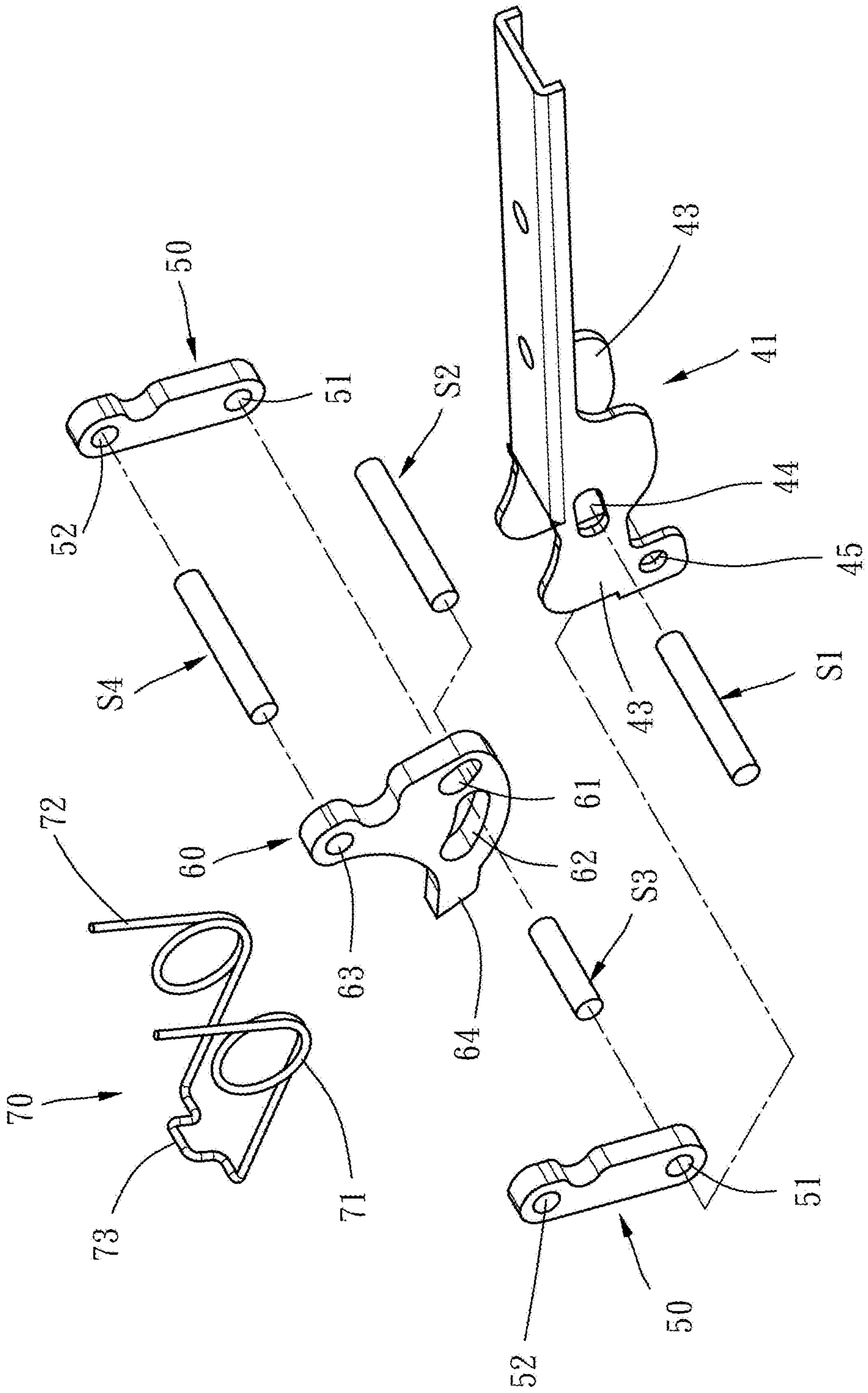
FIG. 3 is an exploded perspective view of driving members of the stapler according to the first preferred embodiment of the present invention.

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in this specification, such as 'front', 'upper', 'lower', 'back', 'left', 'right', 'top', 'bottom', 'in', and 'out', are also just for illustrative description on the basis of normal usage direction, not intended to limit the claimed scope.

Referring to FIG. 1 to FIG. 4, a stapler with improved driving structure according to a first preferred embodiment of the present invention is primarily composed of a body 10, a first shaft S1, a second shaft S2, a staple driver 20, an elastic unit 3, an operation lever 40, a third shaft S3, two pivotably connecting members 50, a hook member 60, a fourth shaft S4, and a restoring member 70. A staple magazine N can be installed in the stapler, and staples (not shown) are accommodated in the staple magazine N.

The body 10 is composed of two shells 10A which are approximately symmetric to each other. The two shells 10A are configured correspondingly to each other, and each configured with a first shaft connecting portion 11, a second shaft connecting portion 12, a shaft displacement limiting portion 13, a staple driver sliding portion 14, a staple magazine installation portion 15, and a plate spring fixing portion 16. The second shaft connecting portion 12 is located in lower front of the first shaft connecting portion 11. The shaft displacement limiting portion 13 is located above the first shaft connecting portion 11 and the second shaft connecting portion 12. In this embodiment, the shaft displacement limiting portion 13 is formed from a plate. The plate has an arc section 131 with specific radian, and a straight section 132 integrally connected with the arc section 131. For example, the arc section 131 of the shaft displacement limiting portion 13 is configured with uniform distance from the center of the second shaft connecting portion 12 by centering therearound. The staple driver sliding portion 14 is located at the front of the shell and arranged vertically. The staple magazine installation portion 15 is located at the bottom of the shell and arranged horizontally for disposing the staple magazine N. The plate spring fixing portion 16 is located at the middle of the shell.

The first shaft S1 is connected to the first shaft connecting portions 11 of the body 10. Specifically speaking, two ends of the first shaft S1 are fixedly connected to the first shaft connecting portions 11 of the two shells 10A respectively.

The second shaft S2 is connected to the second shaft connecting portions 12 of the body 10. Specifically speaking, two ends of the second shaft S2 are fixedly connected to the second shaft connecting portions 12 of the two shells 10A respectively.

The staple driver 20 is disposed in the staple driver sliding portions 14 located at the front of the body 10, and displaceable vertically relative to the body 10 for striking the staple. The staple driver 20 has an installation hole 21 and a hooked hole 22. In this embodiment, the installation hole 21 is located below the hooked hole 22.

The elastic unit 3 may include only one plate spring, or be composed of a plurality of plate springs piled on one another as illustrated in this embodiment. The body portion of the elastic unit 3 is disposed in the plate spring fixing portions 16 of the body 10, and pressed by an elastic force adjusting button 31 which is disposed on the body 10 in a frontward and backward slidable manner for adjusting the tension of the elastic unit 3. The front end of the elastic unit 3 is inserted in the installation hole 21 of the staple driver 20. When the staple driver 20 is moved upward, the staple driver 20 drives the elastic unit 3 to elastically deform to apply downward elastic force to the staple driver 20.

The operation lever 40 has a first arm 41 and a second arm 42. The first arm 41 is pivotably connected to the first shaft S1. The second arm 42 is sleeved onto the first arm 41, and extends to the outside of the body 10. The first arm 41 is respectively provided on left and right sides thereof with two arm plates 43 extending downwardly, and has two first holes 44 and two first lower pivot holes 45. The two first holes 44 are located on the arm plates 43 respectively. The two first lower pivot holes 45 are located on the arm plates 43 respectively, and located in lower front of the two first holes 44. The first shaft S1 is inserted through the two first holes 44. The second arm 42 is arranged to be pressed by a hand to drive the first arm 41 to swing about the first shaft S1.

Two ends of the third shaft S3 are inserted in the two first lower pivot holes 45 of the operation lever 40, and the body of the third shaft S3 penetrates through the two pivotably connecting members 50 and the hook member 60, which will be specified hereinafter.

Each of the two pivotably connecting members 50 has a second lower pivot hole 51 and a first upper pivot hole 52. The third shaft S3 is inserted through the second lower pivot holes 51 in a relatively pivotable manner. The two pivotably connecting members 50 are located between the two arm plates 43.

The hook member 60 has a second hole 61, an elongated hole 62, a second upper pivot hole 63, and a hook portion 64. The second shaft S2 is inserted through the second hole 61 in a way that the hook member 60 is swingable about the second shaft S2. The third shaft S3 is inserted through the elongated hole 62 in a way that the first arm 41 can drive the hook member 60 through the third shaft S3. The hook portion 64 is releasably hooked at the hooked hole 22 of the staple driver 20. The elongated hole 62 of the hook member 60 is configured with uniform distance from the center of the second upper pivot hole 63 by centering therearound. Besides, the hook member 60 is located between the two pivotably connecting members 50.

The fourth shaft S4 is connected to the first upper pivot holes 52 of the two pivotably connecting members 50 and the second upper pivot hole 63 of the hook member 60 in a relatively pivotable manner. Besides, the left and right ends of the fourth shaft S4 protrude out of the two pivotably connecting members 50 respectively to slidably abutted against the shaft displacement limiting portions 13 of the body 10 respectively.

Figure 4:
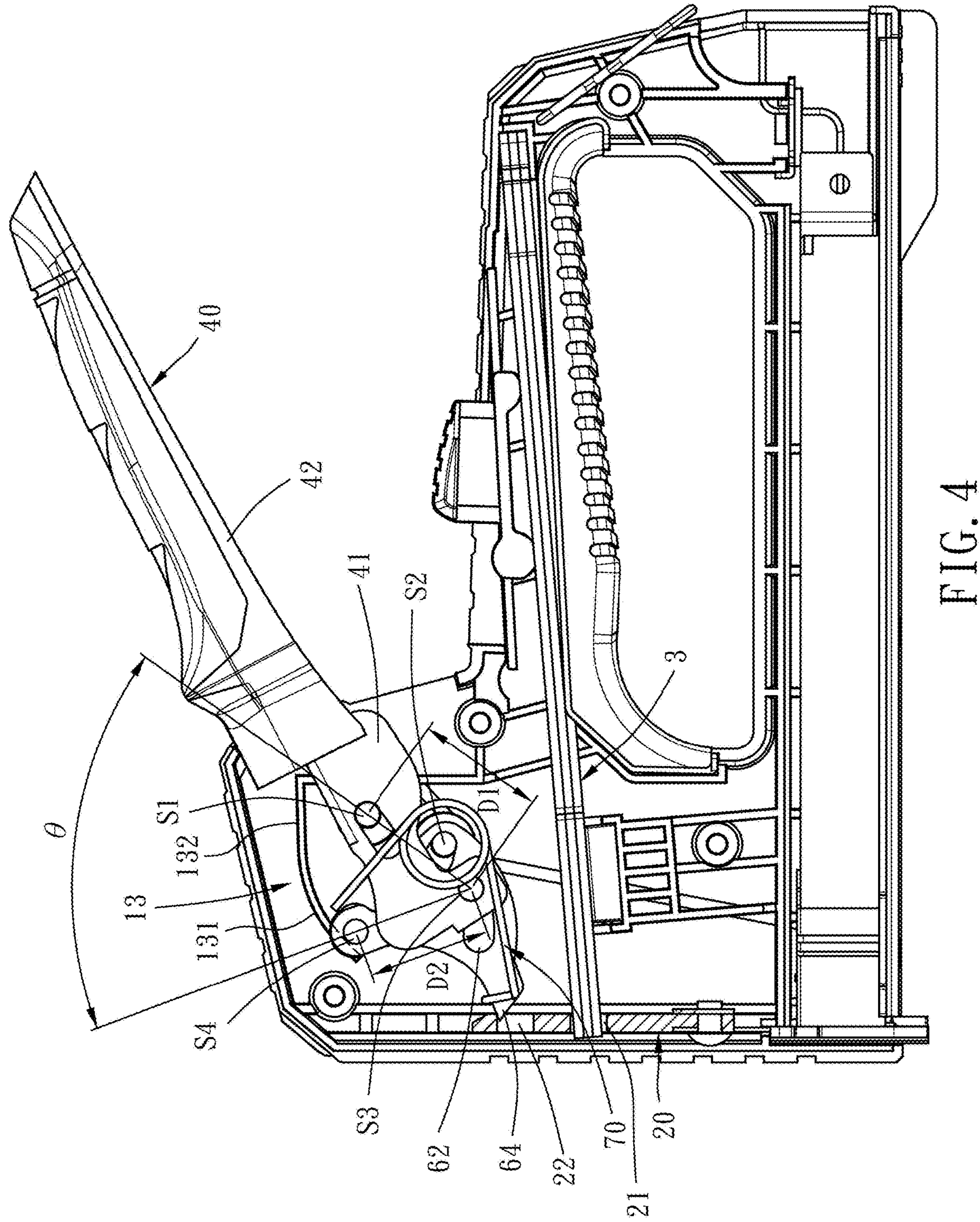
FIG. 4 is an assembled front view of the stapler according to the first preferred embodiment of the present invention in the condition that a shell thereof is removed.
Figure 5:
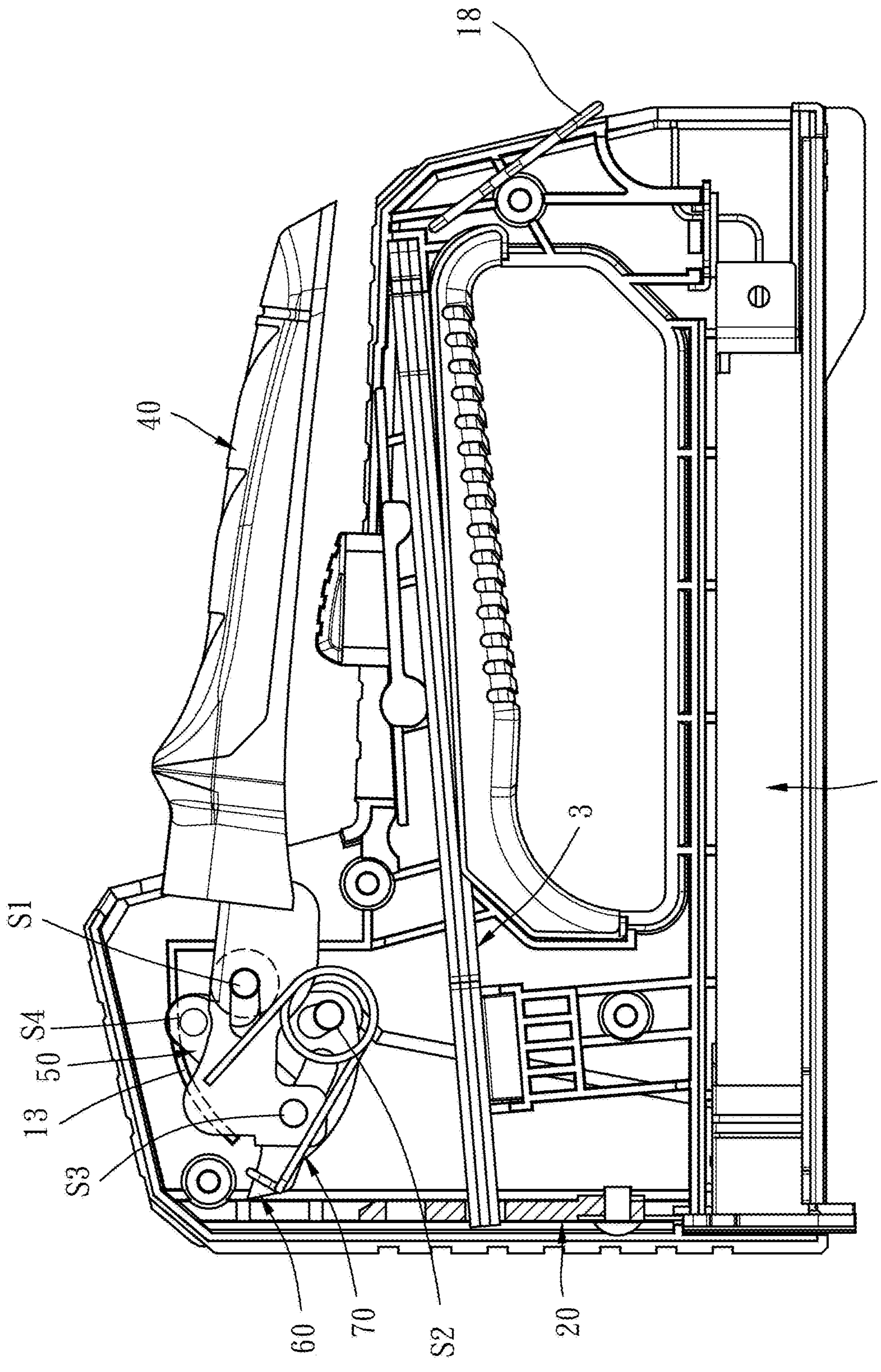
FIG. 5 is similar to FIG. 4, but schematically showing the status after an operating action.

In this embodiment, a first distance D1 is provided from the axis of the first shaft S1 to the axis of the third shaft S3, a second distance D2 is provided from the axis of the third shaft S3 to the axis of the fourth shaft S4, and the first distance D1 is substantially smaller than or equal to the second distance D2. Preferably, the first distance D1 is 0.8 to 0.9 times the second distance D2. Besides, as shown in FIG. 4, an included angle θ is provided between an imaginary extending line passing the axis of the first shaft S1 and the axis of the third shaft S3 and another imaginary extending line passing the axis of the third shaft S3 and the axis of the fourth shaft S4. In this embodiment, the aforementioned included angle θ is ranged from 30 degrees to 57 degrees. Specifically speaking, in the process that the operation lever 40 is pressed downwardly from the status of not being pressed downwardly yet as shown in FIG. 4 to displace to the position of lower dead point as shown in FIG. 5, the included angle θ will be changed in the range from 30 degrees to 57 degrees.

The restoring member 70 in this embodiment is a torsion spring. The restoring member 70 has a looped installation portion 71, and a first connecting end 72 and a second connecting end 73, which integrally extend from the looped installation portion 71. The looped installation portion 71 is sleeved onto the second shaft connecting portion 12 of the body 10. The first connecting end 72 is connected to the first shaft connecting portion 11 of the body 10. The second connecting end 73 is connected to the hook portion 64 of the hook member 60, and pressed on the top surface of the hook portion 64. As a result, the elastic force of the restoring member 70 is arranged for making the hook portion 64 of the hook member 60 displace downwardly.

When the stapler of this embodiment is in use, it is operated in a manner as described hereinafter. The status of the stapler without being pressed is as shown in FIG. 4. When using the stapler, the user presses the operation lever 40 so that the second arm 42 of the operation lever 40 is swung downwardly about the first shaft S1. Meanwhile, the operation lever 40 drives the third shaft S3 to move upwardly, so that the third shaft S3 pushes the inner rim of the elongated hole 62 to make the hook member 60 swing upwardly about the second shaft S2. When the hook member

60 is swung upwardly, the hook member 60 drives the fourth shaft S4 to move along the inner rim of the shaft displacement limiting portion 13. During the operation, the hook portion 64 of the hook member 60 drives the staple driver 20 to move upwardly. The upwardly moved staple driver 20 makes the elastic unit 3 elastically deformed. When the hook member 60 is swung to the status that the hook portion 64 thereof is separated from the hooked hole 22 of the staple driver 20, the staple driver 20 is powerfully pressed downward by the elastically deformed elastic unit 3 right away, so as to downwardly displace fast, as shown in FIG. 5, such that the staple driver 20 drives the staple to the stapled object.

After that, when the hand releases the operation lever 40 and no longer presses thereon, the hook member 60 is swung downwardly by the elastic force of the restoring member 70 to reversely drive the second arm 42 of the operation lever 40 to swing upwardly, so that the operation lever 40 is restored to the initial unpressed non-operated status as shown in FIG. 4. At this moment, the operation lever 40 can be operated to drive the staple again.

In the above-described stapling process, for the operation lever 40, the operation lever 40 is pivoted about the first shaft S1. The first shaft S1 is the fulcrum, the effort arm is provided between the outermost side of the operation lever 40 and the first shaft S1, and the load arm is provided by the partial operation lever 40 located between the first shaft S1 and the third shaft S3. The length of this load arm equals to the aforementioned first distance D1 from the axis of the first shaft S1 to the axis of the third shaft S3. Besides, for the hook member 60, because the upwardly swung hook member 60 drives the fourth shaft S4 to move along the inner rim of the shaft displacement limiting portion 13, a pushing force is provided to the hook member 60. At this moment, the partial hook member 60 and/or the partial pivotably connecting members 50 located between the third shaft S3 and the fourth shaft S4 can be regarded as another effort arm. The length of such another effort arm equals to the aforementioned second distance D2 from the axis of the third shaft S3 to the axis of the fourth shaft S4. The third shaft S3 can be regarded as another fulcrum, and the partial hook member 60 located between the third shaft S3 and the outermost tip of the hook portion 64 can be regarded as another load arm. The present invention has the configuration design that the first distance D1 is substantially smaller than or equal to the second distance D2. In other words, the load arm is relatively shorter, and the aforementioned another effort arm is relatively longer. Therefore, when the operation lever 40 is pressed downwardly by the user to drive the third shaft S3 so that the third shaft S3 drives the hook member 60 to swing, the aforementioned another effort arm designed with the relatively longer length is supplementary in driving the hook member 60 to swing, resulting in that it is relatively easier to drive the hook member 60 to swing, thereby relatively easier to drive the staple driver 20 to move upward. As a result, the effort-saving effect of the present invention is better than the prior arts. In practice, the configuration design that the first distance D1 is 0.8 to 0.9 times the second distance D2 can strike an optimum balance between space arrangement for the components and providing relatively better effort-saving effect. Besides, by the above-described configuration design that the included angle θ is ranged from 30 degrees to 57 degrees, the initial open angle of the operation lever 40 can be arranged for conforming to the ergonomic range of the average person's open palm, and it is effective in controlling the stroke of the staple driver 20, and also helpful in attaining relatively better effort-saving effect.

Besides, in the stapling process, the fourth shaft S4 is slidingly abutted against the inner rim of the shaft displacement limiting portion 13 designed with specific curve, not only providing pushing force to the hook member 60 so that the partial hook member 60 and/or the partial pivotably connecting members 50 located between the third shaft S3 and the fourth shaft S4 can serve as another effort arm, but also limiting the movement of the fourth shaft S4 on a set track, thereby further ensuring the position of the moving hook member 60 and left-and-right balance thereof. That makes the hook member 60 hook and move the staple driver 20 and release the staple driver 20 relatively more stably and positively. It should be additionally mentioned that in this embodiment, the shaft displacement limiting portion 13 is configured with the arc section 131 and the straight section 132 integrally connected with each other. In practice, in the process that the operation lever 40 is pressed downwardly, the extent of the fourth shaft S4 being abutted against the inner rim of the shaft displacement limiting portion 13 can be designed in a way that the contact extent gradually increases (from lighter to heavier) from the arc section 131 toward the straight section 132. That means the fourth shaft S4 in the initial stage of displacement thereof is slightly abutted against, or even not in contact with, the arc section 131. However, the longer the fourth shaft S4 is displaced toward the straight section 132, the more tightly the fourth shaft S4 is abutted against the inner rim of the shaft displacement limiting portion 13. For example, the highest tightness of the fourth shaft S4 being abutted against the inner rim of the shaft displacement limiting portion 13 is attained near the juncture of the arc section 131 and the straight section 132. In this way, in the process that the hook member 60 drives the staple driver 20 to move upward, the pushing force provided to the hook member 60 gradually increases so that the aforementioned another effort arm generates relatively better supplementary effect and thereby helpful in overcoming the more and more tension of the elastic unit 3, resulting in that it is relatively easier to drive the staple driver 20 to move upward, so the present invention can attain better effort-saving effect than the prior arts.

Resulted from the features that the restoring member 70 is the torsion spring and the restoring member 70 has the looped installation portion 71 installed at the position of the second shaft connecting portion 12, the hook member 60 can be directly applied with torque for swinging, which can reduce the force applied to the second shaft S2. Besides, compared with the conventional design using extension spring or compression spring, the restoring member 70 in the present invention can facilitate space utilization and component arrangement.

In addition, the first hole 44 is configured as an elongated hole. Therefore, when the stapler of the present invention is in the status just after driving the staple out as shown in FIG. 5, the user can pull the operation lever 40 backwardly so that the operation lever 40 can be easily and stably buckled with a buckle 18 disposed on the body 10 for the storage of the stapler.

Except for the above instanced description, the present invention can be modified and implemented as described hereinafter.

For example, the shaft displacement limiting portion 13 of the body 10 is unlimited to be configured with uniform distance from the center of the second shaft connecting portion 12 by centering therearound. The shaft displacement limiting portion 13 of the body 10 is also unlimited to the above-described restriction on the upper edge of the fourth shaft S4. The shaft displacement limiting portion 13 can be modified into the restriction on only the lower edge of the fourth shaft S4. Alternatively, the shaft displacement limiting portion 13 can be modified into the restriction on both the upper edge and the lower edge of the fourth shaft S4. Besides, the operation lever 40 is unlimited to have two arm plates 43, but may be modified to have only one arm plate 43. The stapler is also unlimited to have two pivotably connecting members 50, but may be modified to have only one pivotably connecting member 50. In addition, the first hole 44 of the operation lever 40 is unlimited to the straight elongated hole as provided in the embodiment, but may be a circular hole or arc elongated hole. The second hole 61 of the hook member 60 is also unlimited to the straight elongated hole as provided in the embodiment, but may be a circular hole or arc elongated hole.

Referring to FIG. 6 to FIG. 9, a second preferred embodiment of the present invention provides a stapler. The stapler primarily includes a body 10, a staple driver 20, an elastic unit 3 and an operation unit 5.

The body 10 has a staple driver sliding portion 14 and a staple outlet portion 17. A staple magazine for accommodating staples is disposed inside the body 10 and located at the bottom thereof. A spring (not shown) is disposed in the staple magazine for pushing the staples toward the staple outlet portion 17. The staple driver sliding portion 14 is located at the front side of the body 10 and arranged vertically. The staple outlet portion 17 is located below the staple driver sliding portion 14, and communicates with the staple driver sliding portion 14. The staple outlet portion 17 is configured to accommodate a to-be-driven staple (not shown) in the staple magazine.

Figure 6:
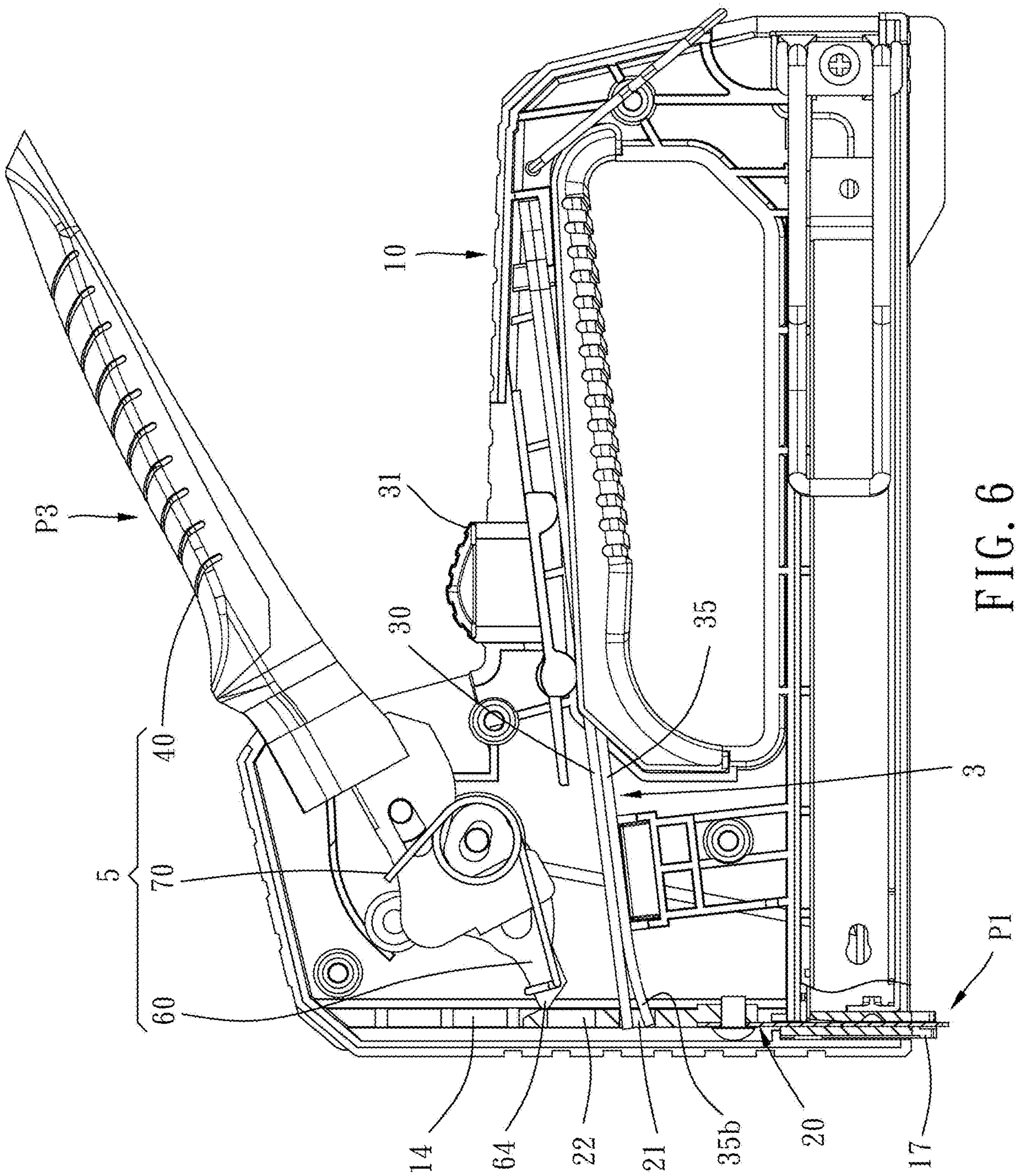
FIG. 6 is an assembled front view of a stapler according to a second preferred embodiment of the present invention in the condition that a body thereof is partially removed, showing the status that a staple driver is located at a protruding position and a hook member is abutted against the surface of the staple driver in a stuck manner.
Figure 7:
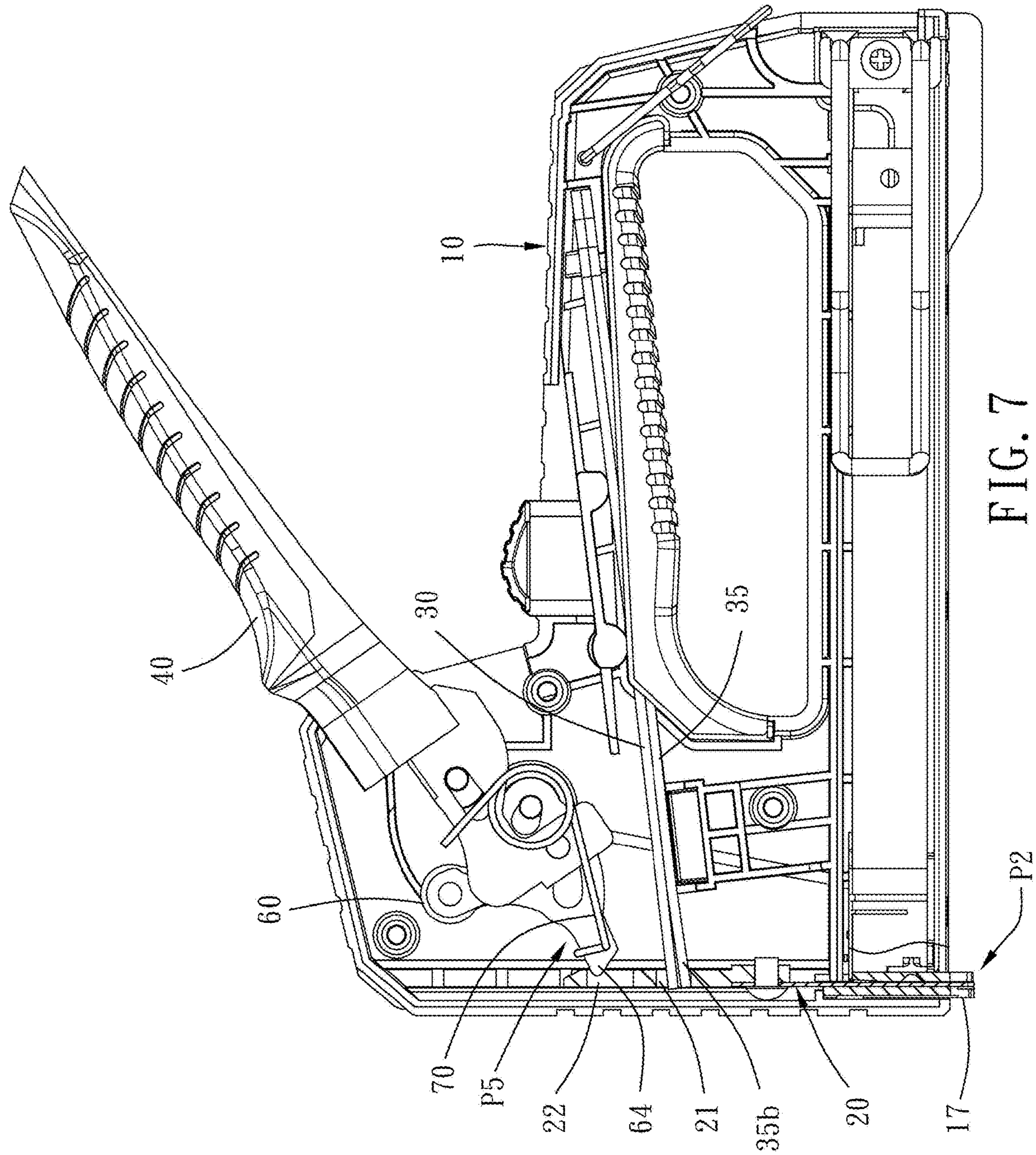
FIG. 7 is similar to FIG. 6, but showing the status that the staple driver is located at a retracted position and a hook portion of the hook member is hooked at a hooked hole of the staple driver.
Figure 9:
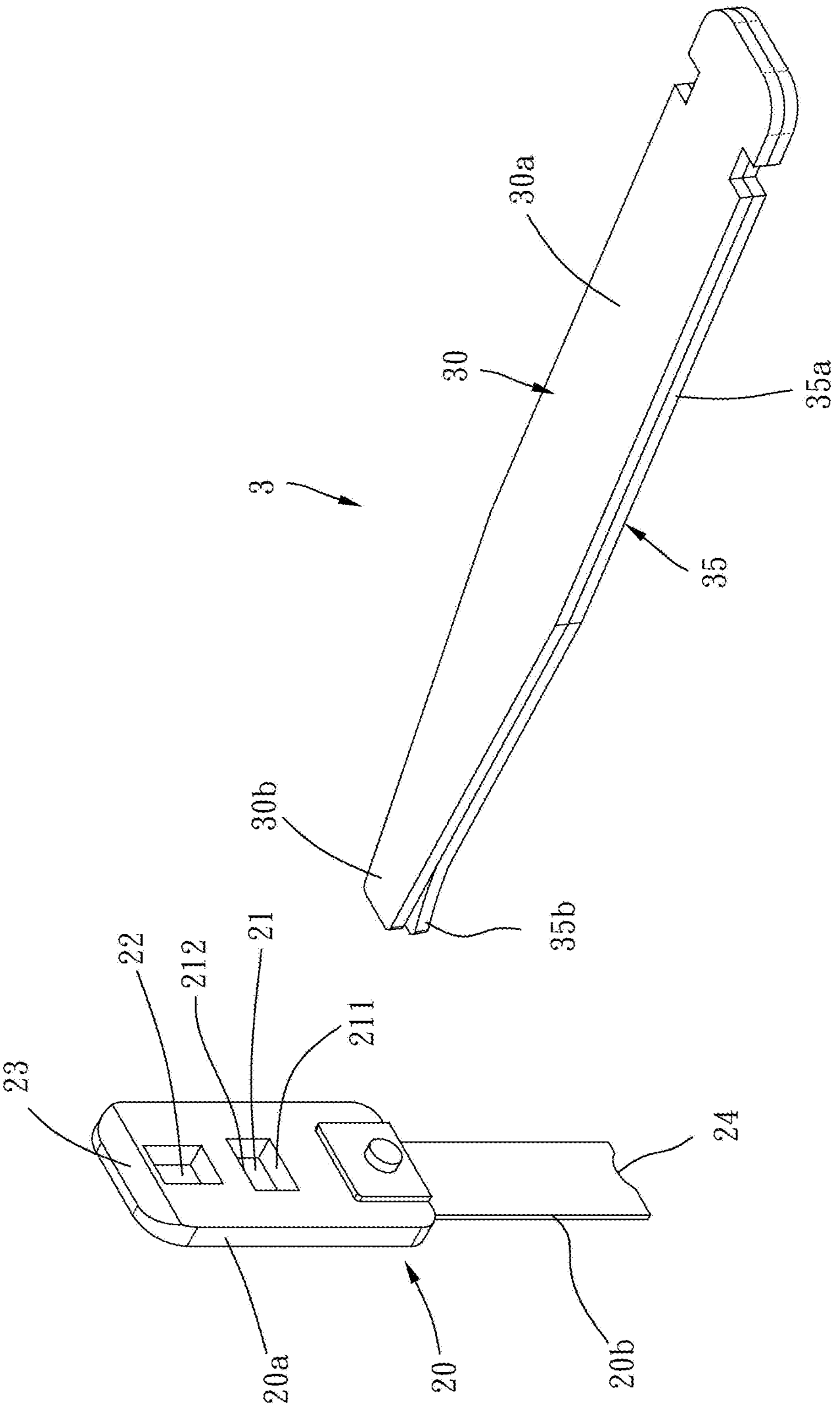
FIG. 9 is an exploded perspective view of the staple driver and an elastic unit of the stapler according to the second preferred embodiment of the present invention.

The staple driver 20 is disposed in the staple driver sliding portion 14 of the body 10 in a way that the staple driver 20 is capably of vertical reciprocating sliding. In this way, when the staple driver 20 slides relative to the body 10 downwardly to pass through the staple outlet portion 17, the staple driver 20 will strike the staple so that the staple will be driven out of the staple outlet portion 17 fast. As shown in FIG. 9, the staple driver 20 has a base plate 20*a* made of metal and relatively larger in thickness, and a staple driving sheet 20*b* made of metal, relatively smaller in thickness and fixed to the bottom of the base plate 20*a*. The base plate 20*a* has an installation hole 21, a hooked hole 22, and an inclined guiding surface 23 located at the top of the base plate 20*a*. The staple driving sheet 20*b* has a bottom end 24 opposite to the guiding surface 23. The installation hole 21 is located at the middle of the base plate 20*a*. The hooked hole 22 is located above the installation hole 21. Besides, the stroke of the vertical reciprocating sliding of the staple driver 20 relative to the staple driver sliding portion 14 of the body 10 includes a protruding position P1 as shown in FIG. 6 and a retracted position P2 as shown in FIG. 7. When the staple driver 20 is located at the protruding position P1, the bottom end 24 protrudes out of the staple outlet portion 17. When the staple driver 20 is located at the retracted position P2, the bottom end 24 is retracted into the staple outlet portion 17.

The elastic unit 3 may be composed of only one plate spring, two or more than two plate springs, or the plate spring of any aforementioned amount and an elastic member such as elastic sheet or elastic wire, for providing elastic force to make the staple driver 20 slide downwardly fast toward the protruding position P1 to pass through the staple outlet portion 17 to strike the staple, which is also referred to as staple striking force hereinafter, and elastic force to make the staple driver 20 stay at the protruding position P1 after striking the staple, which is also referred to as maintaining force hereinafter. In this embodiment, the elastic unit 3 includes a plate spring 30 for providing the staple striking force to the staple driver 20, and an elastic abutting member 35 for providing the maintaining force to make the staple driver 20 stay at the protruding position P1, and the elastic abutting member 35 is implemented by another plate spring. In practice, this another plate spring (elastic abutting member 35) is abutted on the bottom of the aforementioned plate spring 30. Specifically speaking, the plate spring 30 has a body portion 30*a*, and a free end 30*b* integrally extending from the body portion 30*a*. The body portion 30*a* is fixed to the body 10, and an elastic force adjusting button 31 disposed on the body 10 in a frontward and backward slidable manner is pressed on the body portion 30*a* for adjusting the tension of the plate spring 30. The free end 30*b* of the plate spring 30 is inserted in the installation hole 21 of the staple driver 20. In this way, when the staple driver 20 is driven by the operation unit 5 to displace upward along the staple driver sliding portion 14, the free end 30*b* of the plate spring 30 will be moved upwardly along with the staple driver 20 so that the body portion 30*a* is deformed in a bent manner so as to store elastic restoring force. This elastic restoring force will drive the staple driver 20 to slide downwardly. That means once the staple driver 20 is released from the operation unit 5, the aforementioned elastic restoring force will drive the staple driver 20 to displace downwardly fast toward the protruding position P1 to strike the staple. Besides, the relatively lower elastic abutting member 35 (another plate spring) provides the maintaining force to make the staple driver 20 stay at the protruding position P1. This elastic abutting member 35 has a body portion 35*a* abutted on the aforementioned plate spring 30, and an elastic abutting portion 35*b* extending downwardly from the body portion 35*a* in an inclined or bent manner. The elastic abutting portion 35*b* is elastically deformable by a received force, and restorable. The elastic abutting portion 35*b* is abutted against the bottom edge 211 of the installation hole 21 of the staple driver 20. In this way, after the staple driver 20 strikes the staple and the stapler is lifted up, the bottom end 24 of the staple driver 20 still stays at the protruding position P1, as shown in FIG. 6. At this time, if the stapler is lifted and the protruding bottom end 24 of the staple driver 20 is pressed on another position of the stapled object to make the pressing force overcome the elastic force of the elastic abutting portion 35*b* of the elastic abutting member 35, the bottom end 24 of the staple driver 20 will slide inwardly from the protruding position P1 to the retracted position P2 as shown in FIG. 7. Besides, the installation hole 21 of the staple driver 20 is configured in a way that the distance from the top edge 212 to the bottom edge 211 is larger than the total thickness of the plate spring 30 and the elastic abutting member 35 (another plate spring), thereby ensured to provide the staple driver 20 a relatively longer staple driving stroke. In this way, when the staple driver 20 is located at protruding position P1, the free end 30*b* of the plate spring 30 is abutted against the top edge 212 of the installation hole 21, as shown in FIG. 6. When the staple driver 20 is located at the retracted position P2, the elastic abutting portion 35*b* of the elastic abutting member 35 (another plate spring) is pressed and deformed to be abutted on the free end 30*b* of the plate spring 30. At this moment, the free end 30*b* of the plate spring 30 is separated from the top edge 212 of the installation hole 21 for a predetermined distance.

Figure 8:
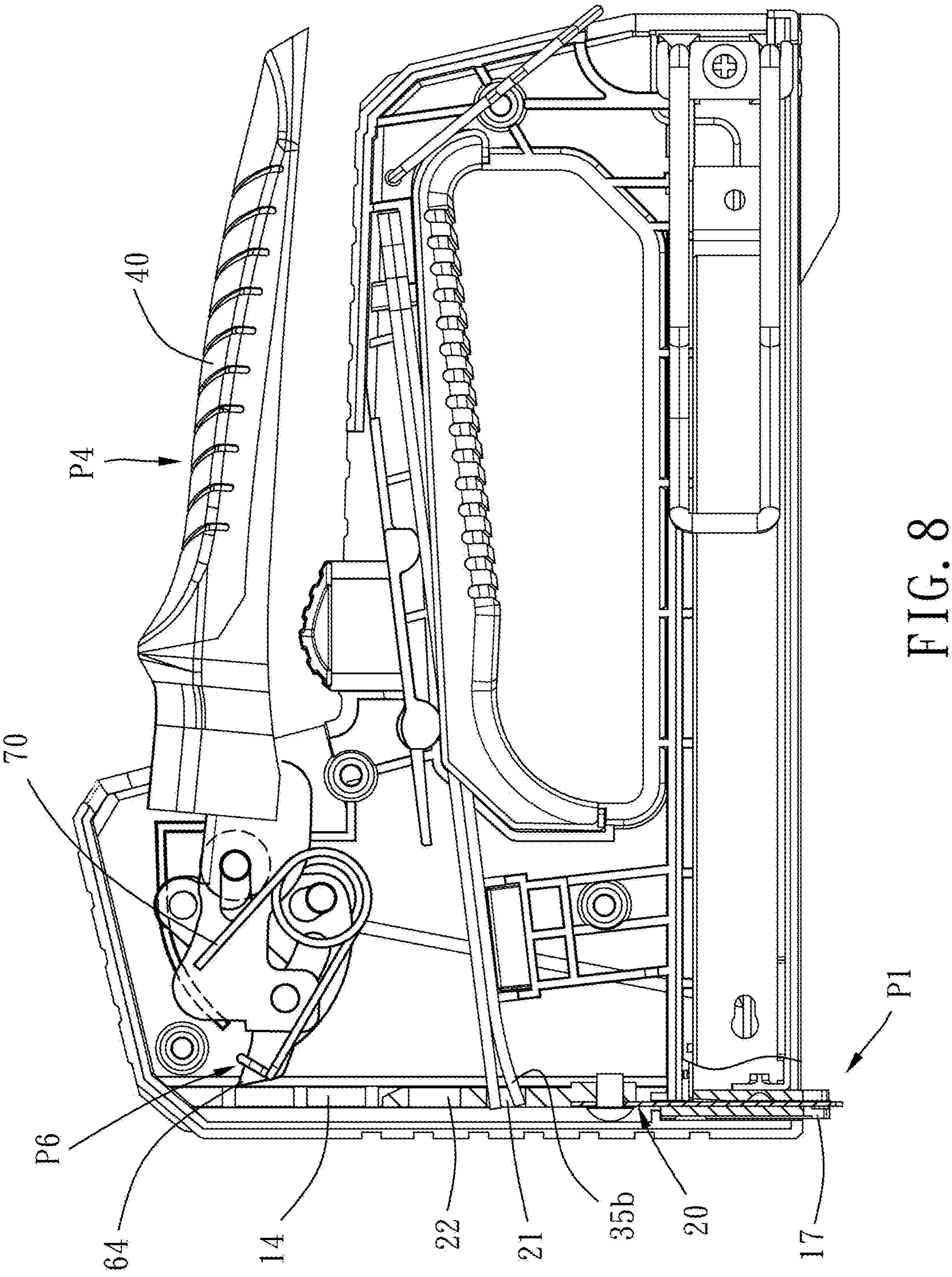
FIG. 8 is similar to FIG. 7, but showing the status that the hook portion drives the staple driver to displace upwardly until the hook portion is separated from the hooked hole, and the staple driver is driven by the elastic force of a plate spring to displace to the protruding position.

The operation unit 5 primarily includes an operation lever 40, a hook member 60, and a restoring member 70. The operation lever 40 is connected to the body 10 in a way that the operation lever 40 is pivotable between an extend-out position P3 as shown in FIG. 6 and a pressed-down position P4 as shown in FIG. 8. The hook member 60 can be driven by the operation lever 40 directly or indirectly through linkages, so as to swing relative to the body 10 between a relatively lower hooked position P5 as shown in FIG. 7 and a relatively upper released position P6 as shown in FIG. 8. Specifically speaking, the hook member 60 has a pointed hook portion 64. When the hook member 60 is located at the hooked position P5, the hook portion 64 is hooked at the hooked hole 22 of the staple driver 20. In this way, when the user presses the operation lever 40 downwardly to force the operation lever 40 to displace from the extend-out position P3 to the pressed-down position P4, the hook portion 64 of the hook member 60 will drive the staple driver 20 to displace upwardly along the staple driver sliding portion 14 away from the protruding position P1 until the hook portion 64 is separated from the hooked hole 22. Once the hook portion 64 is separated from the hooked hole 22, the elastic force of the plate spring 30 and the elastic abutting member 35 (another plate spring) will drive the staple driver 20 to move downwardly fast toward the protruding position P1 so that the staple driver 20 will strike the staple. Besides, resulted from the above-described special structural cooperation design for the body 10, the elastic unit 3 and the staple driver 20, the lower dead point of the stroke of the staple driver 20 being displaced downwardly to strike the staple is designed in a way that the bottom end 24 of the staple driver 20 protrudes out of the staple outlet portion 17 for driving the staple relatively deeper, and the elastic abutting portion 35*b* of the elastic abutting member 35 (another plate spring) makes the bottom end 24 of the staple driver 20 stay at the protruding position P1 as shown in FIG. 6.

In this embodiment, the restoring member 70 is implemented by a torsion spring for providing the elastic force to make the operation lever 40 move from the pressed-down position P4 back to the extend-out position P3. Specifically speaking, as shown in FIG. 8, when the operation lever 40 is located at the pressed-down position P4, the hook member 60 is located at the released position P6 and the staple driver 20 is located at the protruding position P1, the elastic restoring force provided by the restoring member 70 will drive the hook member 60 to swing downwardly from the released position P6 toward the hooked position P5, so as to drive the operation lever 40 to swing from the pressed-down position P4 back to the extend-out position P3. Meanwhile, the hook portion 64 of the hook member 60 is guided by the guiding surface 23 of the staple driver 20, and at last abutted on the surface of the staple driver 20 adjacent to the hooked hole 22 in a stuck manner, as shown in FIG. 6.

When the stapler of this embodiment is in use, it is operated in a manner described hereinafter. When using the stapler, the user presses the operation lever 40 to make the operation lever 40 swing downwardly from the extend-out position P3 toward the pressed-down position P4, so that the operation lever 40 drives the hook member 60 to swing upwardly. When the hook member 60 is swung upwardly, the hook portion 64 of the hook member 60 drives the staple driver 20 to move upwardly. The upwardly moved staple driver 20 makes the plate spring 30 and the elastic abutting member 35 (another plate spring) elastically deformed. When the hook member 60 is swung upwardly to a predetermined position so that the hook portion 64 thereof is separated from the hooked hole 22 of the staple driver 20 to release the staple driver 20, the staple driver 20 is powerfully pressed downward by the elastically deformed plate spring 30 and elastic abutting member 35 right away, so as to displace downwardly fast, such that the staple driver 20 drives the staple to the stapled object and at last stays at the protruding position P1.

When the user's hand releases the operation lever 40 and no longer presses thereon, the hook member 60 is swung downwardly by the elastic force of the restoring member 70 to reversely drive the operation lever 40 to swing upwardly. Meanwhile, the elastic abutting portion 35*b* of the elastic abutting member 35 is abutted against the bottom edge 211 of the installation hole 21 of the staple driver 20, making the staple driver 20 stay at the protruding position P1. Because the hook portion 64 is abutted against the surface of the staple driver 20 in a stuck manner, the hook portion 64 cannot be moved into the hooked hole 22. Therefore, at this time, the hook portion 64 of the operation unit 5 is located out of the hooked hole 22 of the staple driver 20, as shown in FIG. 6. At this time, even if the user presses the operation lever 40 again, the hook portion 64 is still abutted against the surface of the staple driver 20 in a stuck manner to make the staple driver 20 tightly abutted against the surface of the staple driver sliding portion 14 of the body 10, so the hook portion 64 will not be moved upwardly again and thereby cannot drive the staple driver 20 to displace away from the protruding position P1 again. In other words, the above-described mechanism provides a safety insurance switch to disable the stapler from re-triggering.

In the status as shown in FIG. 6, if the user wants to trigger the stapler again, the user can press the bottom end 24 of the staple driver 20 on the stapled object to apply a force to the bottom end 24. When this force overcomes the elastic force of the elastic abutting portion 35*b*, the staple driver 20 will be moved upwardly relative to the body 10 to retract from the protruding position P1 to the retracted position P2. Meanwhile, the staple driver 20 will be displaced upwardly relative to the hook portion 64, making the hook portion 64 of the hook member 60 hooked at the hooked hole 22 of the staple driver 20 again, as shown in FIG. 7. After that, when the operation lever 40 is pressed, the hook portion 64 hooked at the staple driver 20 can drive the staple driver 20 to move, so as to strike the staple again. In other words, the user can take an action of holding the stapler to press the bottom end 24 of the staple driver 20 on any object to force the bottom end 24 of the staple driver 20 to retract to the retracted position P2, which can be regarded as a safety-off action.

It can be known from the above description that the present invention can provide a relatively longer staple driving stroke of the staple driver 20 in the limited space in the body 10. The staple driving stroke refers to the distance from the position of the staple driver 20 being driven by the hook portion 64 and separated therefrom to the protruding position P1. In this way, the sufficient staple striking force can be provided by using the plate spring relatively fewer in amount or smaller in elasticity. Besides, resulted from the configuration design that the bottom end 24 of the staple driver 20 protrudes out of the staple outlet portion 17 when striking the staple, the staple is driven relatively deeper, such that the effects of effort-saving operation and positive staple striking are attained. In addition, after the stapler of the present invention drives the staple out, it can be triggered again only after the bottom end 24 of the staple driver 20 is forced to retract from protruding position P1 to the retracted position P2, which provides a safety mechanism for avoiding false triggering after the stapler is triggered, so that the operation of the stapler of the present invention is relatively safer.

In the second embodiment, the aforementioned another plate spring is utilized to serve as the elastic abutting member 35, so that the elastic abutting member 35 and the plate spring 30 can cooperate to provide the elastic force for making the staple driver 20 slide toward the protruding position P1, i.e. the aforementioned staple striking force or the force the downward pressing force for operating the operation lever 40 has to overcome. That can attain the effect of conveniently setting or adjusting the staple striking force (or the downward pressing force for the operation lever) during the manufacture of the stapler. Besides, the elastic abutting portion 35*b* of the elastic abutting member 35 makes the staple driver 20 stay at the protruding position P1. However, the configuration design of the elastic unit 3 in the present invention is unlimited thereto, but may have various modification. For example, the amount, thickness and type of the plate spring 30 and the elastic abutting member 35 can be changed for providing the required suitable elastic force.

Figure 10:
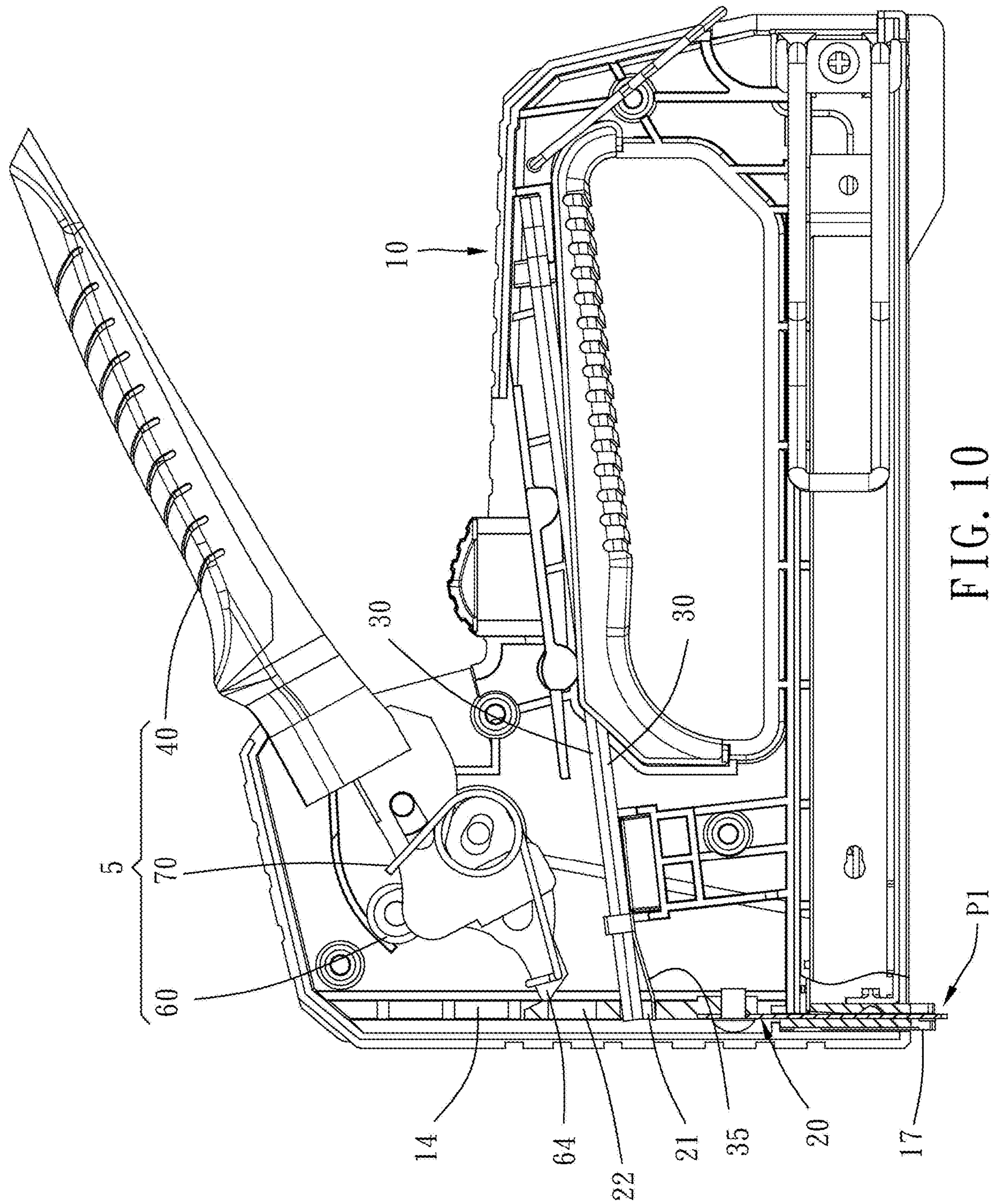
FIG. 10 is an assembled front view of a stapler according to a third preferred embodiment of the present invention in the condition that a body thereof is partially removed, showing the status that a staple driver is located at a protruding position and a hook member is abutted against the surface of the staple driver in a stuck manner.
Figure 11:
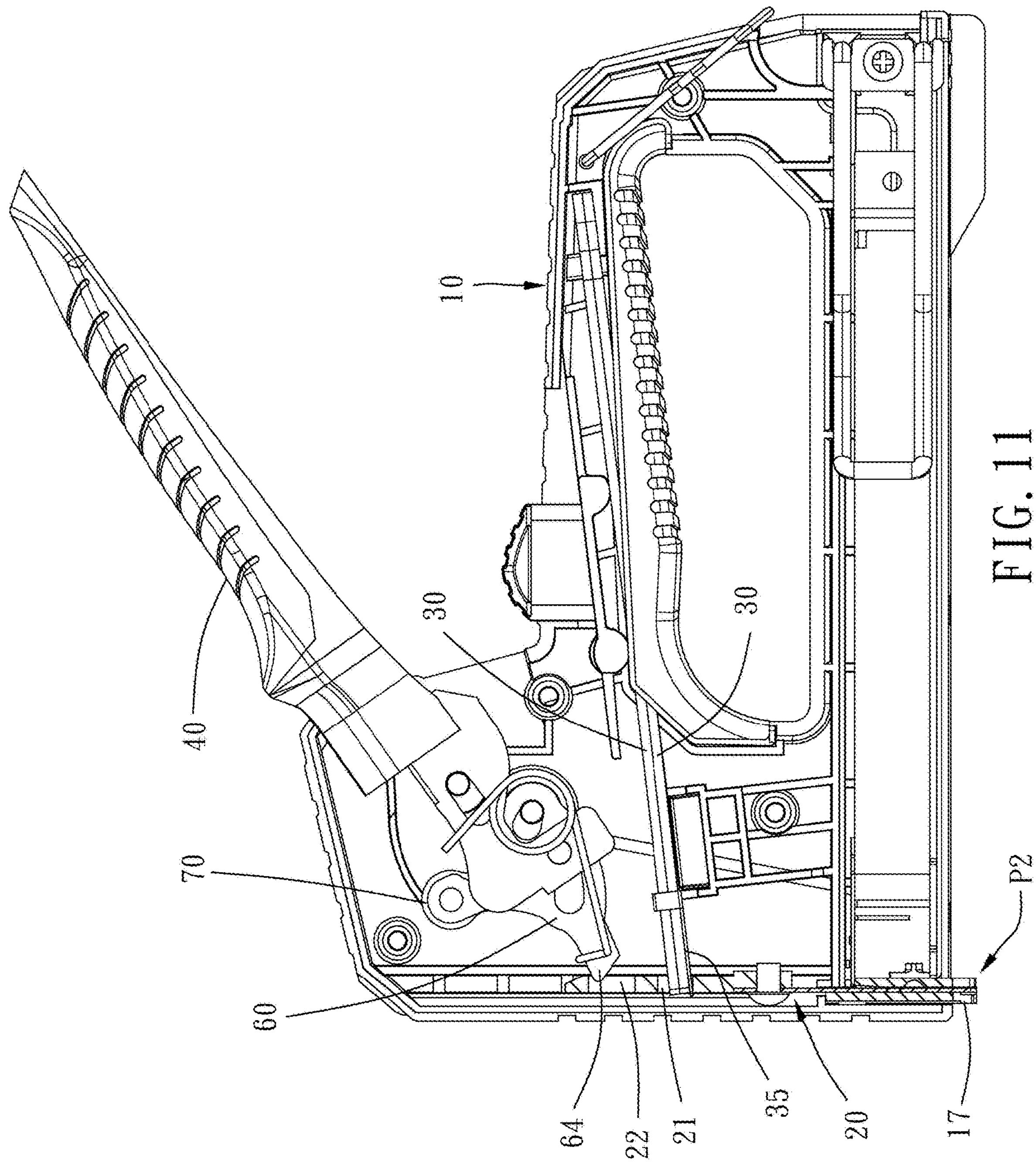
FIG. 11 is similar to FIG. 10, but showing the status that the staple driver is located at a retracted position and the hook member is hooked at a hooked hole of the staple driver.
Figure 12:
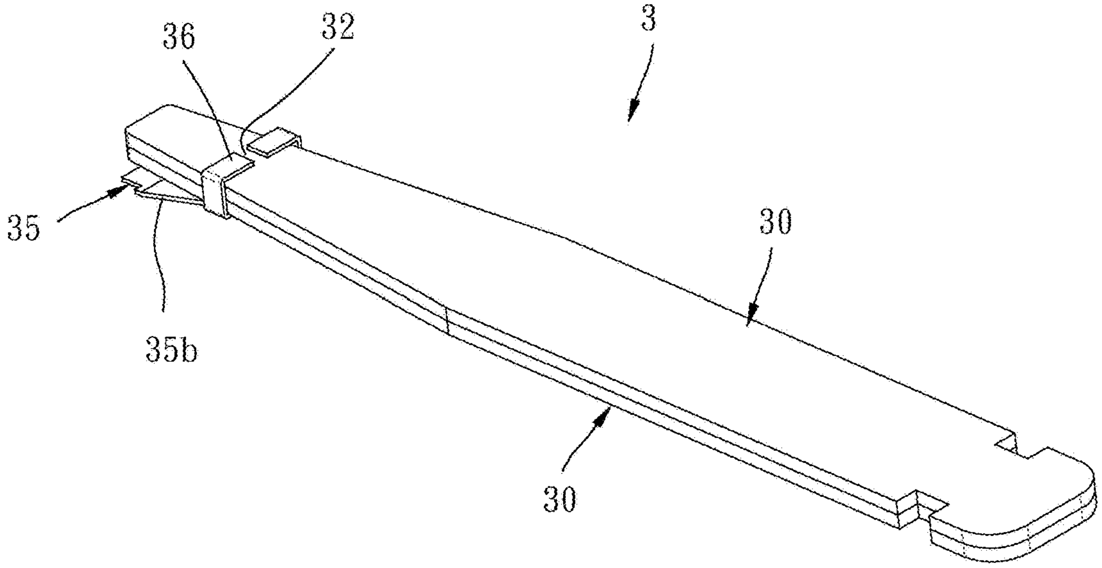
FIG. 12 is an assembled perspective view of an elastic unit of the stapler according to the third preferred embodiment of the present invention.

Further speaking, a stapler according to a third preferred embodiment of the present invention is shown in FIG. 10 to FIG. 12, which is primarily different from the above-described embodiment in that the elastic unit 3 has two plate springs 30 inserted in the installation hole 21 of the staple driver 20, and an elastic abutting member 35. In this embodiment, the elastic abutting member 35 is a thin elastic sheet. Specifically speaking, the plate spring 30 has a first connecting portion 32. The elastic abutting member 35 has a second connecting portion 36 and an elastic abutting portion 35*b*. The second connecting portion 36 of the elastic abutting member 35 is disposed on the first connecting portion 32 of the plate spring 30. The elastic abutting portion 35*b* of the elastic abutting member 35 extends from the second connecting portion 36 inclinedly and downwardly relative to the plate spring 30, and is abutted against the bottom edge 211 of the installation hole 21. As shown in FIG. 10, when the staple driver 20 is located at the protruding position P1, the free end of the plate spring 30 is abutted against the top edge 212 of the installation hole 21. Besides, as shown in FIG. 11, when the staple driver 20 is located at the retracted position P2, the free end of the plate spring 30 is separated from the top edge 212 of the installation hole 21. In other words, in this embodiment, the elastic abutting portion 35*b* of the elastic abutting member 35 is provided by the elastic sheet, which provides the elastic force to make the staple driver 20 stay at the protruding position P1, i.e. the aforementioned maintaining force. Besides, two plate springs 30 are utilized to be the primary members for providing the staple striking force. However, using only one plate spring is also workable, of course. As a result, the effect of conveniently setting or adjusting the maintaining force and the staple striking force for the staple driver 20 during the manufacture of the stapler can be attained.

Figure 13:
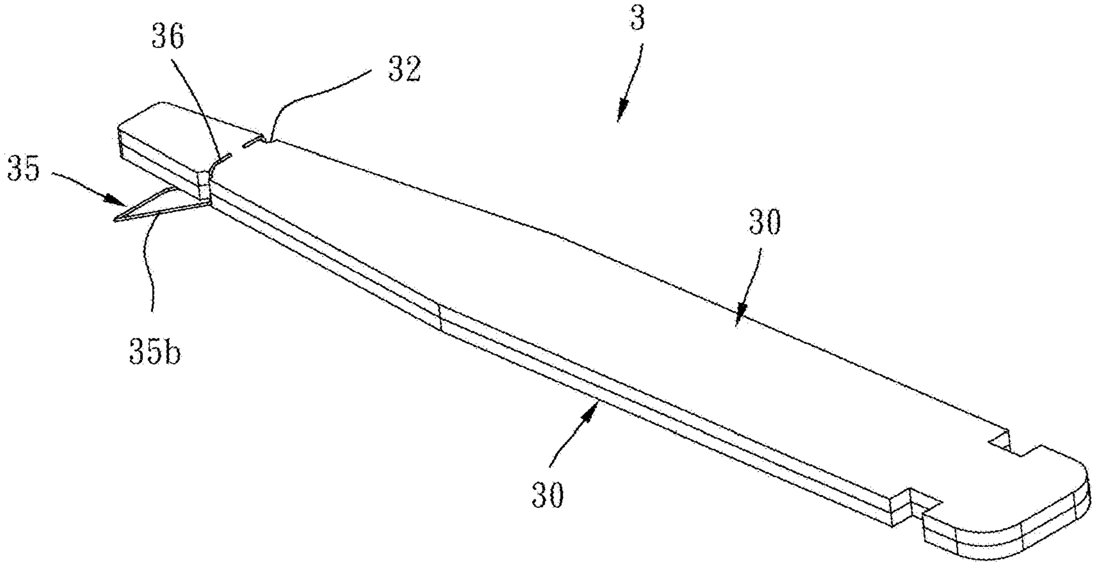
FIG. 13 is an assembled perspective view of an elastic unit of a stapler according to a fourth preferred embodiment of the present invention.

An elastic unit 3 of the stapler according to a fourth preferred embodiment of the present invention is shown in FIG. 13, which is primarily different from the aforementioned third embodiment in that the elastic abutting member 35 is an elastic wire formed from a steel wire by bending. The first connecting portion 32 of the plate spring 30 includes two grooves located on two sides of the plate spring 30. The second connecting portion 36 of the elastic abutting member 35 is clasped in the grooves, and the elastic abutting portion 35*b* extends from the second connecting portion 36 inclinedly and downwardly. As a result, the stapler according to this embodiment can also attain the objective of the present invention, and the elastic unit 3 thereof is relatively easier in manufacture and installation.

Figure 14:
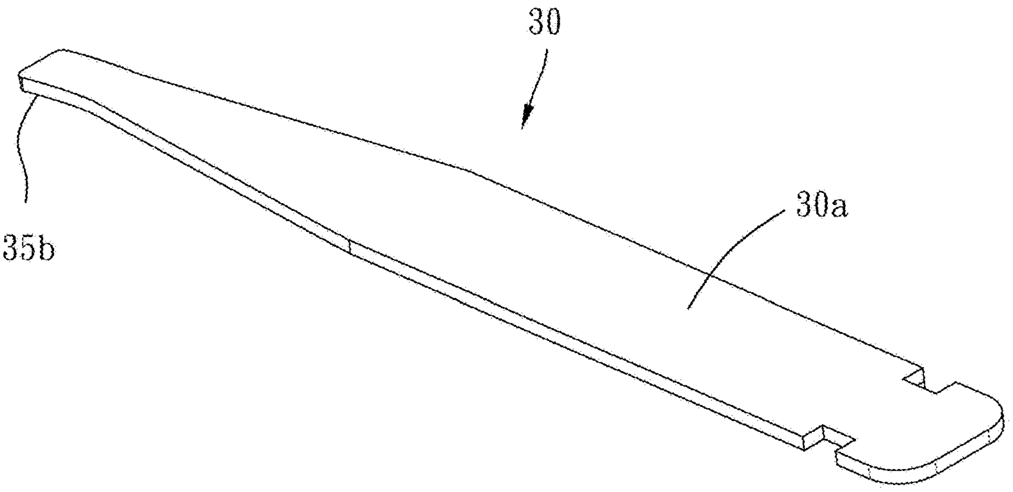
FIG. 14 is a perspective view of an elastic unit of a stapler according to a fifth preferred embodiment of the present invention.

An elastic unit 3 of the stapler according to a fifth preferred embodiment of the present invention is shown in FIG. 14, which is primarily different from the above-described embodiments in that the elastic unit 3 only includes a plate spring 30. Specifically speaking, the plate spring 30 has an inclinedly extending free end which directly becomes the elastic abutting portion 35*b*. It is obvious even though it is not shown in the figure that when the staple driver 20 is located at the protruding position P1 or the retracted position P2, the elastic abutting portion 35*b* is abutted against the bottom edge 211 of the installation hole 21 and separated from the top edge 212 of the installation hole 21. In this way, a single plate spring 30 can be utilized for providing both the staple striking force and the maintaining force making the staple driver 20 stay at the protruding position P1, which not only facilitates the manufacture and the assembly, but also attains the effects of effort-saving operation and positive staple striking.

Figure 15:
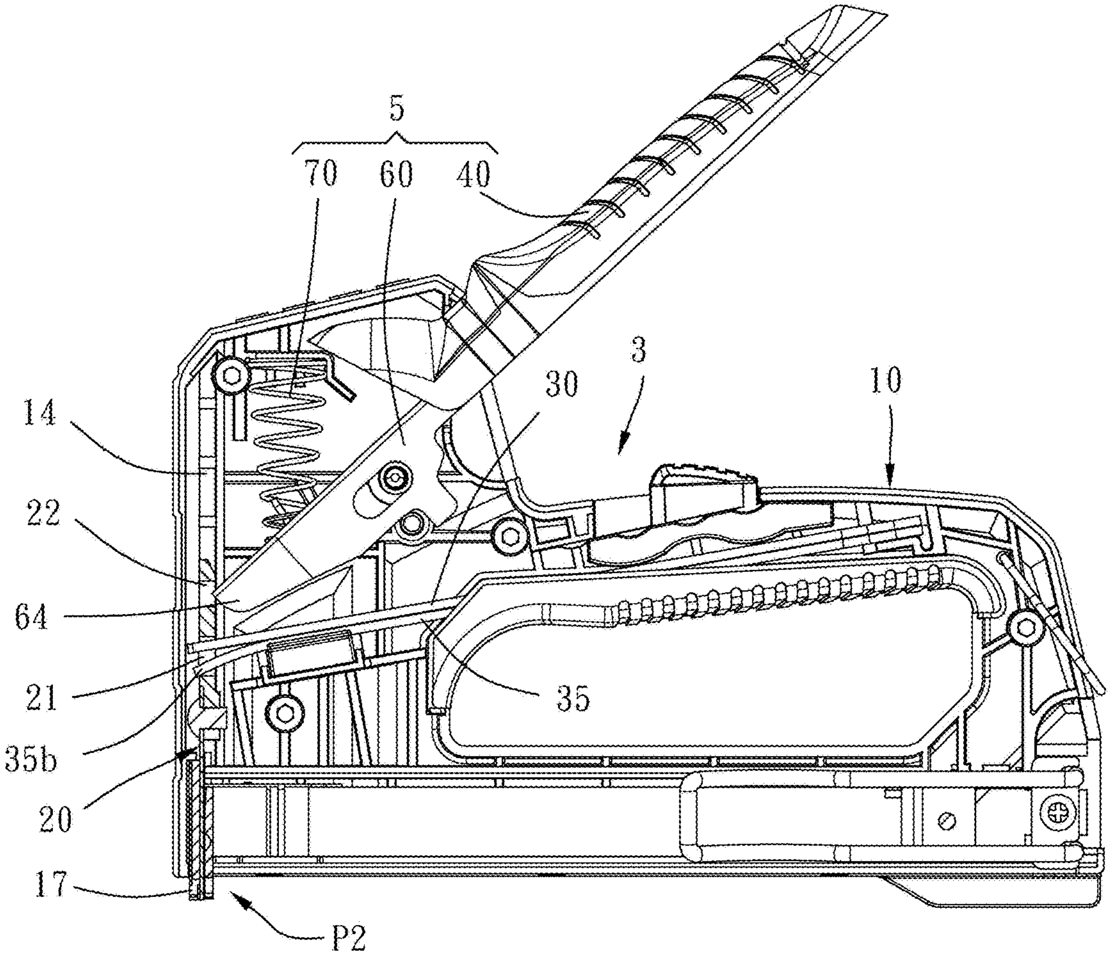
FIG. 15 is an assembled front view of a stapler according to a sixth preferred embodiment of the present invention in a condition that a body thereof is partially removed.

A stapler according to a sixth preferred embodiment of the present invention is shown in FIG. 15, which is different from the above embodiments in providing another type of operation unit 5. In this embodiment, the hook member 60 is directly connected with the operation lever 40, so the hook portion 64 is directly driven by the operation lever 40. The restoring member 70 is a compression spring. The stapler according to this embodiment can also attain the objective of the present invention.

What is claimed is:

1. A stapler, comprising:

a body having a first shaft connecting portion, a second shaft connecting portion, and a shaft displacement limiting portion;

a first shaft connected to the first shaft connecting portion of the body;

a second shaft connected to the second shaft connecting portion of the body;

a staple driver disposed in the body in a vertically displaceable manner, the staple driver having an installation hole and a hooked hole;

an elastic unit disposed in the body, an end of the elastic unit being inserted in the installation hole of the staple driver;

an operation lever having a first hole and a first lower pivot hole, the first shaft being inserted through the first hole;

a third shaft connected to the first lower pivot hole of the operation lever;

a pivotably connecting member having a second lower pivot hole and a first upper pivot hole, the third shaft being pivotally connected to the second lower pivot hole;

a hook member having a second hole, an elongated hole, a second upper pivot hole and a hook portion, the second shaft being inserted through the second hole, the third shaft being inserted through the elongated hole, the hook portion being releasably hooked at the hooked hole of the staple driver;

a fourth shaft pivotally connected to the first upper pivot hole of the pivotably connecting member and the second upper pivot hole of the hook member, the fourth shaft being slidably abutted against the shaft displacement limiting portion of the body when the hook member is swung; and a restoring member having a first connecting end connected to the body, and a second connecting end connected to the hook member in a way that an elastic force of the restoring member makes the hook portion of the hook member displace downwardly;

wherein a first distance is provided from an axis of the first shaft to an axis of the third shaft; a second distance is provided from the axis of the third shaft to an axis of the fourth shaft; the first distance is smaller than or equal to the second distance.

2. The stapler as claimed in claim 1, wherein the first distance is smaller than the second distance.

3. The stapler as claimed in claim 2, wherein the first distance is 0.8 to 0.9 times the second distance.

4. The stapler as claimed in claim 1, wherein the shaft displacement limiting portion is located above the first shaft connecting portion and the second shaft connecting portion.

5. The stapler as claimed in claim 4, wherein the shaft displacement limiting portion has an arc section; when the hook member is swung, the fourth shaft is slidably abutted against the arc section of the shaft displacement limiting portion.

6. The stapler as claimed in claim 5, wherein the shaft displacement limiting portion further has a straight section integrally connected with the arc section; when the hook member is swung, a contact extent of the fourth shaft being abutted against the shaft displacement limiting portion gradually increases from the arc section toward the straight section.

7. The stapler as claimed in claim 1, wherein an included angle is provided between an imaginary extending line passing the axis of the first shaft and the axis of the third shaft and another imaginary extending line passing the axis of the third shaft and the axis of the fourth shaft; the included angle is ranged from 30 degrees to 57 degrees.

8. The stapler as claimed in claim 1, wherein the restoring member is a torsion spring; the torsion spring has a looped installation portion, and the first connecting end and the second connecting end, which extend from the looped installation portion; the looped installation portion is sleeved onto the second shaft connecting portion of the body; the first connecting end is connected to the first shaft connecting portion, and the second connecting end is connected to the hook portion.

9. The stapler as claimed in claim 1, wherein the body has a staple driver sliding portion, and a staple outlet portion communicating with the staple driver sliding portion and configured for accommodating a staple;

the staple driver is slidably disposed in the staple driver sliding portion of the body and configured for passing through the staple outlet portion of the body to drive the staple out; the staple driver has a bottom end, and is displaceable relative to the staple driver sliding portion between a protruding position and a retracted position; when the staple driver is located at the protruding position, the bottom end protrudes out of the staple outlet portion; when the staple driver is located at the retracted position, the bottom end is retracted into the staple outlet portion;

the elastic unit has a plate spring which is elastically deformable, and an elastic abutting portion; the plate spring is fixed to the body, and has a free end; the free end is inserted in the installation hole of the staple driver for providing an elastic force to make the staple driver slide toward the protruding position; the elastic abutting portion is configured for providing an elastic force to make the staple driver stay at the protruding position;

the operation lever is connected to the body in a way that the operation lever is pivotable between an extend-out position and a pressed-down position; the hook portion is directly or indirectly driven by the operation lever, and separatably hooked at the hooked hole of the staple driver; the restoring member is configured for providing an elastic force to make the operation lever move back to the extend-out position from the pressed-down position;

when the operation lever is driven to move from the extend-out position to the pressed-down position, the hook portion drives the staple driver to move away from the protruding position until the hook portion is separated from the hooked hole so that the elastic force of the plate spring drives the staple driver to move toward the protruding position so as to make the bottom end of the staple driver pass through the staple outlet portion to strike the staple, and the elastic abutting portion makes the bottom end of the staple driver stay at the protruding position.

10. The stapler as claimed in claim 9, wherein the elastic unit further comprises an elastic abutting member, and the elastic abutting member is another plate spring; the elastic abutting member has a body portion abutted on the plate spring, and the elastic abutting portion inclinedly extending from the body portion; the elastic abutting portion is abutted against a bottom edge of the installation hole; when the staple driver is located at the protruding position, the free end of the plate spring is abutted against a top edge of the installation hole; when the staple driver is located at the retracted position, the free end of the plate spring is separated from the top edge of the installation hole.

11. The stapler as claimed in claim 9, wherein the elastic unit further comprises an elastic abutting member; the elastic abutting member is an elastic sheet or an elastic wire, which is inclinedly fixed to the plate spring, and comprises the elastic abutting portion; the elastic abutting portion is abutted against a bottom edge of the installation hole; when the staple driver is located at the protruding position, the free end of the plate spring is abutted against a top edge of the installation hole; when the staple driver is located at the retracted position, the free end of the plate spring is separated from the top edge of the installation hole.

12. The stapler as claimed in claim 9, wherein the plate spring is provided at the free end thereof with the elastic abutting portion.

13. The stapler as claimed in claim 9, wherein when the bottom end of the staple driver stays at the protruding position and the operation lever is moved back to the extend-out position from the pressed-down position, the hook portion is abutted on a surface of the staple driver in a stuck manner and located adjacent to the hooked hole.

14. The stapler as claimed in claim 13, wherein when the bottom end of the staple driver is located at the protruding position and applied with a force which displaces the staple driver from the protruding position to the retracted position, the staple driver is displaced relative to the hook portion to make the hook portion hooked at the hooked hole.

15. The stapler as claimed in claim 14, wherein the hooked hole of the staple driver is located above the installation hole; the staple driver is provided at a top end thereof with an inclined guiding surface for slidably abutting against the hook portion.

* * * * *